United States Patent [19]

Evans

[11] 4,388,025
[45] Jun. 14, 1983

[54] GUARD FOR OFFSHORE STRUCTURE

[75] Inventor: Orde R. Evans, Lafayette, La.

[73] Assignee: Oreco III, Inc., Lafayette, La.

[21] Appl. No.: 155,060

[22] Filed: Jun. 2, 1980

[51] Int. Cl.³ .......................... E02B 3/22; B63B 21/00
[52] U.S. Cl. ................................... 405/212; 114/219; 267/140
[58] Field of Search ............... 405/212, 213, 214, 215; 44/219, 220; 267/139, 140

[56] References Cited

U.S. PATENT DOCUMENTS

| 3,145,685 | 8/1964 | Kulick | 114/220 |
| 3,459,004 | 8/1969 | Morini | 405/215 |
| 3,464,214 | 9/1969 | King | 405/214 |
| 3,873,076 | 3/1975 | Evans | 267/140 |
| 3,975,916 | 8/1976 | Watson | 405/212 |
| 4,109,474 | 8/1978 | Files et al. | 114/219 X |

Primary Examiner—David H. Corbin
Attorney, Agent, or Firm—Browning, Bushman, Zamecki & Anderson

[57] ABSTRACT

The invention comprises a guard for disposition adjacent an offshore structure to protect the structure from impact. The guard comprises a tubular body of resilient material, at least one flexible positioning line extending longitudinally through the bore of the tubular body, and a pair of connectors joined to the positioning line or lines and disposed adjacent axially opposite ends of the tubular body for connection to the offshore structure.

10 Claims, 6 Drawing Figures

GUARD FOR OFFSHORE STRUCTURE

SUMMARY OF THE INVENTION

The present invention pertains to a type of device which may be referred to alternatively as a guard, a bumper, or a shock absorber, which is mounted adjacent an offshore structure to protect that structure from impact from barges and other vessels or the like. A typical offshore structure may comprise a horizontal platform supported by generally vertical legs. The platform is supported by the legs above the usual water level so that the legs themselves will oppose, and be subject to impact from, barges or other vessels approaching or moored to the platform. Such offshore structures are extremely expensive, and since damage to the legs can threaten the structural integrity and safety of the entire structure, it is extremely important to protect the legs from such impacts. Accordingly, it has become conventional to mount guards or bumpers on the structure adjacent to, and more specifically laterally outwardly of, the legs or other portions of the structure located in potential impact areas. In the past, some such guard devices have included an elongate rigid core extending generally vertically and surrounded by a tubular body of elastomeric material. In some cases, such elastomeric bodies were comprised of a plurality of annular elastomeric members disposed end to end and rotatable with respect to the central core.

The present invention has for its principal objects the provision of an improved guard device, which, while sufficiently strong to absorb impacts in use, is more flexible upon such impacts, and is also easily adjustable both in terms of its dimensions and its own internal prestress forces.

The device of the present invention includes a tubular body of resilient material, preferably an elastomer. As in the case of the prior art, this body may be comprised of a stack of elastomeric rings disposed in longitudinally aligned, end to end relation. However, rather than a rigid central core, the device has, extending through the bore of this tubular body, flexible positioning means. The positioning means may be in the form of at least one, and preferably two, flexible lines such as metal cables, which, while flexible, are still sufficiently strong to withstand substantial tensile loading. A pair of connection means are adjoined to the positioning means and disposed adjacent axially opposite ends of the resilient tubular body for connection to the offshore structure.

The device preferably includes means for applying a longitudinal compressive load to the stack of elastomeric rings or other resilient tubular body. In the preferred form, in which the positioning means comprises first and second, generally parallel, flexible lines, these lines may cooperate with a pair of abutment members, abutting respective upper and lower ends of the stack of elastomeric rings, to apply such longitudinal compressive load. A first one of the flexible lines has first stop means carried on its lower end engageable with the lower of the abutment members to limit upward movement of the first flexible line with respect to the lower abutment member. The upper end of said first flexible line extends freely through the upper of the abutment members, for relative longitudinal movement therebetween, and is adjoined to the upper of the connection means. Conversely, the second flexible line has second stop means carried on its upper end and engagable with the upper of the abutment members to limit downward movement of the second flexible line with respect to the upper abutment member, while its lower end extends freely through the lower abutment member for relative longitudinal movement therebetween and is adjoined to the lower of the connection means. With this arrangement, placing the flexible lines in tension will urge the abutment members toward one another to apply the compressive load to the resilient tubular body. However, since each of the two lines is only directly connected to one of the two abutment members, flexibility of the device upon impact is increased.

Such flexibility is even further enhanced by several other features of the device. Each of the abutment members has relatively wide aperture means for receiving that one of the two flexible lines which is not directly connected thereto, thus permitting limited lateral movement of such line with respect to that abutment member. Furthermore, swivel means and lateral pivot means are provided at each end of each of the two flexible lines.

The compressive load on the resilient body may be made relatively adjustable by providing means for longitudinally adjusting one of the two stop means relative to the respective flexible line. Likewise, greater variations in the compressive load and/or in the length of the device may be effected by disassembling the device and adding or removing rings from the stack comprising the tubular body.

The device is also provided with means for resisting lateral displacement of the rings comprising the tubular body with respect to one another. More specifically, the rings may have mating axially projecting and receiving formations, which will generally resist such displacement. However, upon relatively high force impacts, these formations may be forced out of engagement with one another allowing certain rings to be displaced laterally to absorb the impact so that it does not damage the device or the attached structure. The amount of force necessary to cause such displacement may be varied by the aforementioned means for adjusting the compressive load on the stack of rings.

Preferably, an integral tube of resilient material, such as a suitable elastomer, is disposed within the stack of rings and in surrounding relation to the flexible lines. The central bore of this tube is preferably wide enough to permit limited lateral movement of the flexible lines therein, while its outer diameter is sized such that it will be spaced slightly from the inner surfaces of the elastomeric rings when the tube and rings are all coaxially aligned. Thus, with unduly interfering with the flexibility of the device, the tube will permit the aforementioned lateral displacement of the rings but will limit the amount of such displacement so that the rings will still remain generally aligned, and the device operated, after such displacement.

Additional features and advantages of the present invention will be made apparent by the following detailed description and the drawings.

BRIEF DESCRIPTION OF THE DRAWING

FIG. 3 is a view similar to that of FIG. 2 showing the device in a flexed position such as it would assume on impact by a barge or the like.

DETAILED DESCRIPTION

Figure 1:
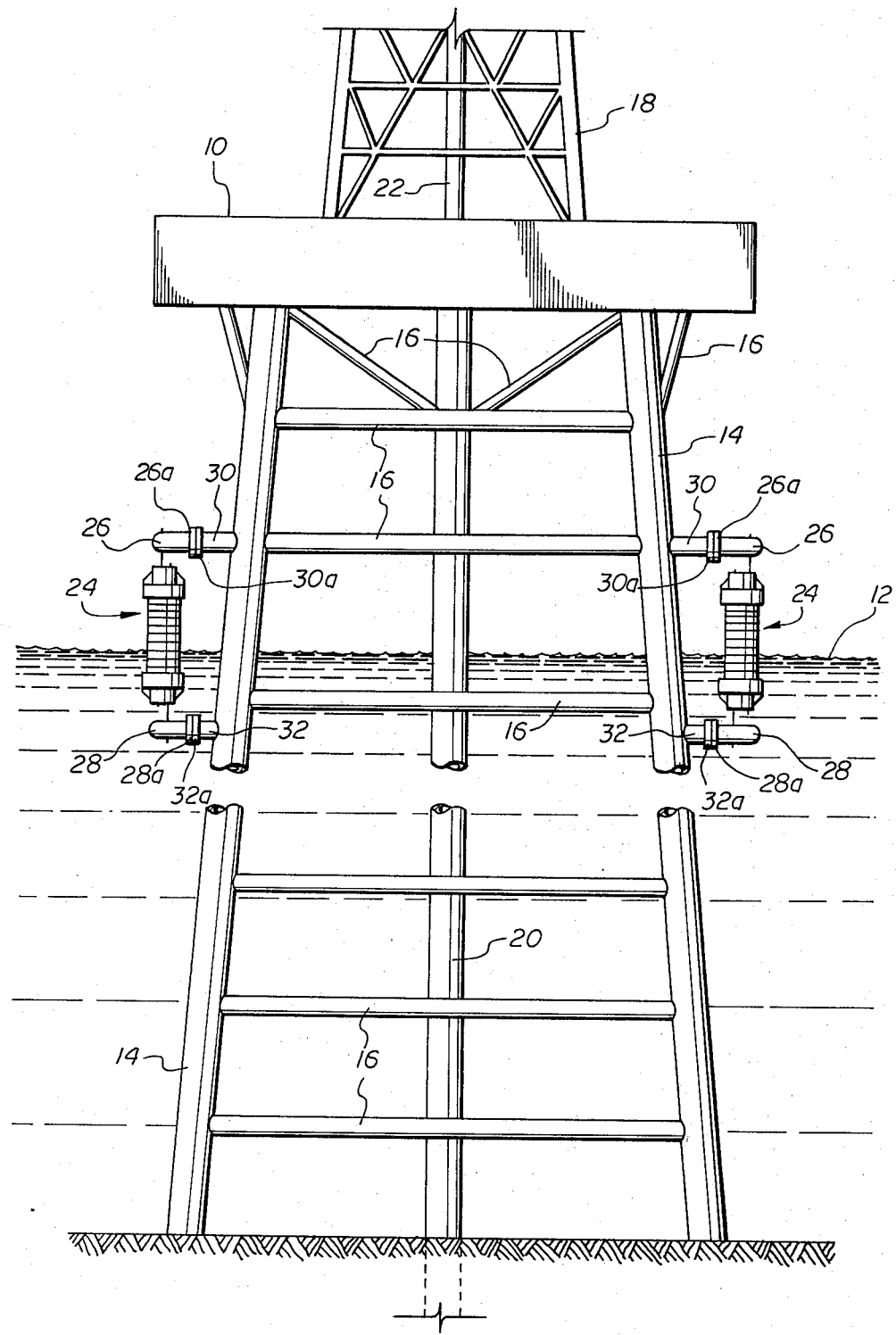
FIG. 1 is a diagrammatical illustration of an offshore structure showing the position of the guard devices of the present invention thereon.
Figure 2:
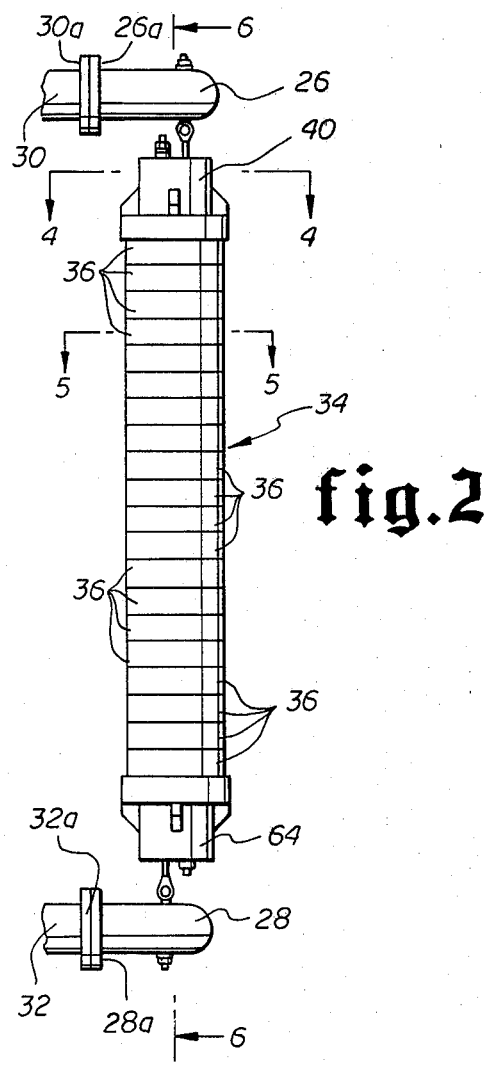
FIG. 2 is a side elevational view of one of the guard devices according to the invention in an unflexed position.

Referring to FIG. 1, there is shown a typical offshore structure, more specifically, a drilling platform. The platform includes a horizontal deck 10 which is supported well above the water level 12 by a plurality of generally vertically extending legs, two of which are shown at 14. The deck 10 and legs 14 are braced with respect to one another by additional structural members 16. The deck 10 may support various types of drilling and production equipment such as a derick 18. A string of casing 20 extends downwardly from platform 10 and into the well, and a string 22 of drill pipes, production tubing, or the like extends into casing 20.

It can be seen that the portions of the platform structure located near the water level 12, particularly the legs 14, will be subject to impact by barges or other vessels as they approach the platform and/or as they are tossed about on the water while moored to the platform. Accordingly, guard devices 24 according to the present invention are mounted on legs 14 so that they are positioned adjacent legs 14 but spaced laterally outwardly therefrom. Thus, the guards 24 can absorb the impact of the aforementioned barges or other vessels and protect legs 14 from such impact.

Each of the guards 24 has a pair of generally horizontally extending connectors 26 and 28 at its upper and lower ends respectively. Connectors 26 are attached to mounting members 30 extending laterally outwardly from legs 14 by flange fittings 26a and 30a on the connectors and mounting members respectively. Similarly, lower connectors 28 are attached to mounting members 32 extending laterally outwardly from legs 14 by respective flange fittings 28a and 32a. By varying the length of the mounting members 30 and 32, guards 24 may be held in substantially vertical positions even though the legs 14 are inclined and the connectors 26 and 28 are of substantially equal length.

Referring now to FIGS. 2-6, one of the guards 24 will be described in greater detail. In addition to the connectors 26 and 28, the guard device 24 comprises a tubular body 34 of resilient material. More specifically, the tubular body 34 is comprised of a stack of elastomeric rings 36 disposed in longitudinally aligned, end to end relation. As used herein, the term "ring" is intended to denote any body having at least one longitudinal throughbore, regardless of whether or not that body is circular in transverse cross section, whether or not the throughbore is centrally located, and whether or not there are additional throughbores. However, in the preferred embodiment shown, each of the rings 36 is annular, with a centrally located throughbore 38 and circular inner and outer diameters.

Figure 4:
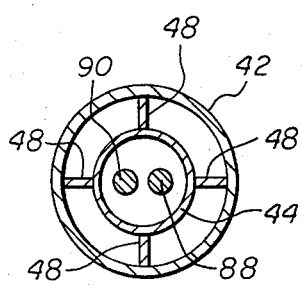
FIG. 4 is a transverse cross-sectional view taken along the line 4—4 of FIG. 2.
Figure 5:
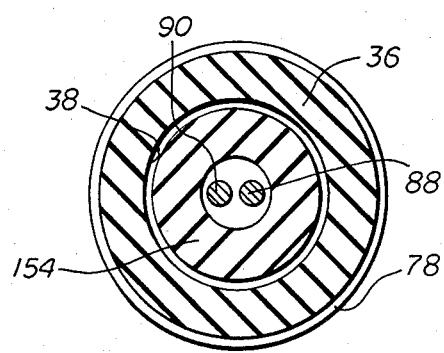
FIG. 5 is a transverse cross-sectional view taken along the line 5—5 in FIG. 2.
Figure 6:
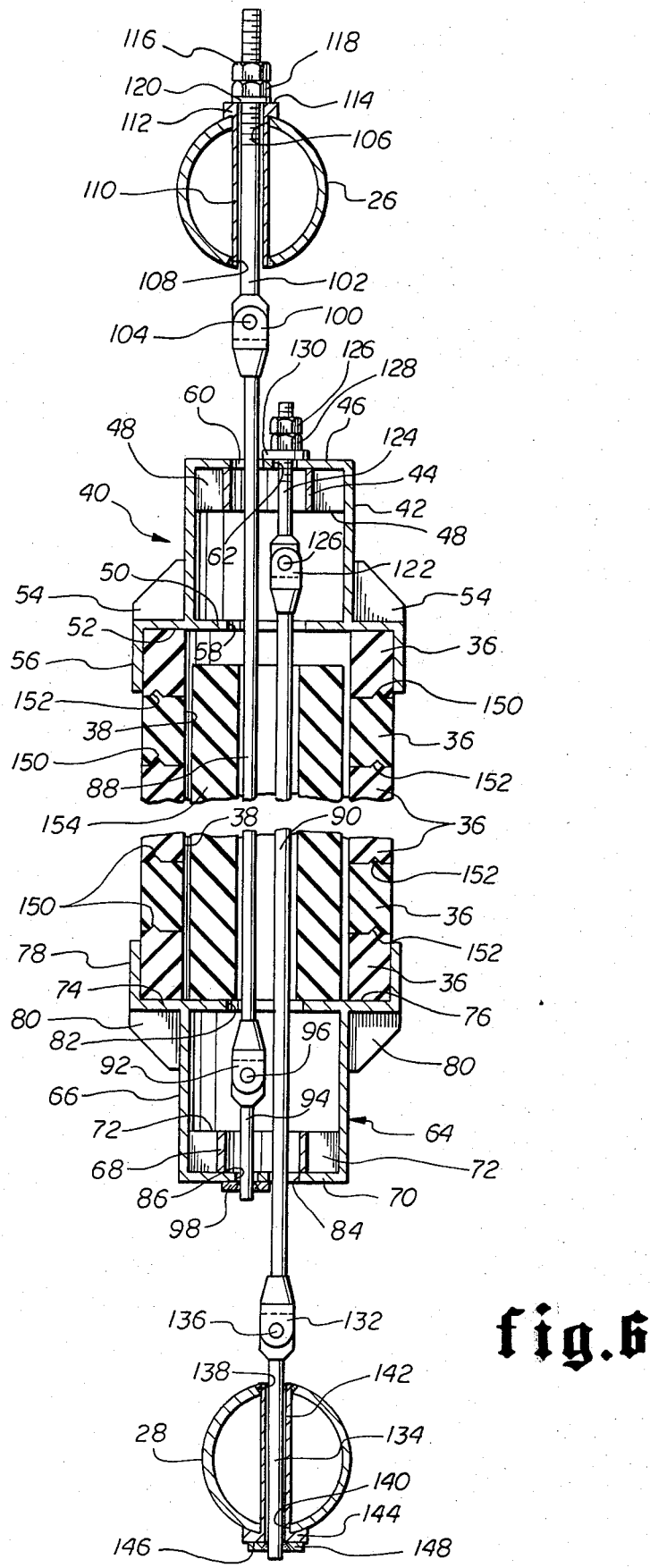
FIG. 6 is an enlarged longitudinal cross-sectional view taken along the line 5—5 in FIG. 2.

The upper end of body 34, and more specifically the uppermost one of rings 36, is engaged by an abutment member in the form of a bonnet 40. As best shown in FIGS. 4 and 6, bonnet 40 includes an outer cylindrical wall 42. A second cylindrical ring 44 of substantially smaller diameter and shorter axial extent that cylindrical wall 42 is positioned coaxially within the upper end of wall 42 and attached thereto by an upper plate 46 which interconnects the upper ends of the cylinders 42 and 44. Additional interconnection and stabilization is provided by radially extending gussets 48 secured between the outer surface of cylinder 44 and the inner surface of cylinder 42 by welding or any other suitable means. A lower plate 50 extends across the lower edge of cylinder 42 and laterally outwardly therefrom to define a downwardly facing surface 52 for abutment with the upper end of the uppermost one of the elastomeric rings 36. Additional interconnection and stabilization between lower plate 52 and cylindrical wall 42 is provided by gussets 54. A cylindrical skirt 56 extends downwardly from the radially outer extremity of lower plate 52. The inner diameter of skirt 56 is sized to surround the uppermost ring 36 and thereby position the bonnet 40 in generally coaxial alignment with that ring. Lower plate 52 has a central aperture 58 therethrough, the diameter of which is approximately the same as the inner diameter of cylinder 44. Upper plate 46 has a pair of apertures 60 and 62 therethrough. These apertures will be described more fully below.

A second abutment member in the form of a bonnet 64 is provided for engaging the lowermost one of the elastomeric rings 36. Bonnet 64 is substantially identical to bonnet 40 except that it is inverted and laterally transposed in orientation. Thus, bonnet 64 comprises an outer cylindrical wall 66 with a smaller cylinder 68 disposed coaxially within its lower end. Cylinders 66 and 68 are interconnected by a lower plate 70 and gussets 72. An upper plate 74 extends across the upper edge of cylinder 66 and radially outwardly therefrom, to define an upwardly facing surface 76 for abutment with the lower end of the lowermost ring 36. A cylindrical skirt 78 extends upwardly from the outer extremity of plate 74 for surrounding the lower ring 36 and positioning bonnet 64 with respect thereto. Gussets 80 interconnect cylinder 66 and plate 74. Plate 74 has a central aperture 82 whose diameter corresponds roughly to the inner diameter of cylinder 68. Plate 70 has apertures 84 and 86 to be described more fully below.

Positioning means, in the form of a pair of generally parallel flexible lines 88 and 90 extend through the central longitudinal bore defined by the stack of elastomeric rings 36. These flexible lines are preferably in the form of metal cables which, while flexible and slightly elastic are sufficiently inelastic to withstand substantial tensile loading. The first cable 88 has its lower end disposed within the outer cylinder 66 of lower bonnet 64. That lower end carries a clevis 92 which is pivotally connected to a rigid metal pin 94 by a horizontal pin 96 for lateral pivotal movement. The other end of pin 94 extends through aperture 86 in plate 70 of bonnet 64. A stop ring 98 is welded to pin 94 externally of bonnet 64. Aperture 88 is large enough to permit rotation of pin 94 therein, whereby pin 94 serves as a swivel element for permitting relative rotation between cable 88 and bonnet 64. However, aperture 86 is small enough so that ring 98 can abut plate 70 radially outwardly of aperture 86 to limit upward movement of pin 94 and the attached cable 88 with respect to bonnet 64.

The upper end of cable 88 extends through apertures 58 and 60 of the uppermost bonnet 40 so that it protrudes longitudinally outwardly therefrom. This upper end of cable 88 carries a clevis 100 which is pivoted to a rigid metal pin 102 by a horizontal pin 104 for lateral pivotal movement of the upper end of cable of 88 with respect to pin 102. The upper end of cable 88 is connected to the uppermost connector 26 by the attached pin 102. Connector 26 is in the form of a horizontally extending cylinder and has diametrically opposed upper and lower openings 106 and 108 therein. A cylindrical sleeve 110 has its ends disposed in respective ones of the openings 106 and 108 so that it extends vertically through connector 26. Sleeve 110 is rigidly affixed to connector 26 by welding or any other suitable means. A radially outwardly extending flange 112 is formed on the upper end of sleeve 110 externally above connector 26 and includes a planar upwardly facing surface 114. Pin 102 extends through sleeve 110 and is sized to be easily rotatable therein so that it forms a swivel interconnecting cable 88 and connector 26. The upper end of pin 102 is threaded to receive a pair of locking nuts 116 and 118 which retain pin 102 in connector 126. An annular washer 20 is interposed between nut 118 and flange 112 to facilitate rotation of pin 102 and the attached nuts.

Conversely, the second cable 90 has its upper end disposed within cylindrical wall 42 of upper bonnet 40. Said upper end of cable 90 carries a clevis 122 pivotally connected to a metal pin 124 by a pin 126 for lateral pivotal movement. The upper end of pin 124 extends through aperture 62 in plate 46 of bonnet 40 and is threaded to receive a pair of locking nuts 126 and 128. A washer 130 is interposed between the bottom nut 128 and plate 46. Aperture 62 is wide enough to permit free rotation of pin 124 therein, but small enough so that washer 130 can abut plate 46 radially outwardly of aperture 62 to limit downward movement of pin 124 and the attached cable 90 with respect to bonnet 40.

The lower end of cable 90 extends through apertures 82 and 84 of lower bonnet 64 and protrudes downwardly below bonnet 64. Said lower ends of cable 90 carries a clevis 132 which is pivotally connected to a metal pin 134 by a pivot pin 136 for lateral pivotal movement. Lower connector 28 has upper and lower diametrically opposed openings 138 and 140 therein. The ends of a cylindrical sleeve 142 are disposed in respective openings 138 and 140 so that sleeve 142 extends vertically through connector 28. Sleeve 142 is rigidly affixed to connector 28 as by welding. A radially outwardly extending flange 144 is formed on the lower end of sleeve 142 externally of connector 128. Flange 144 has a planar downwardly facing surface 146. A washer 148 is welded to the lower end of pin 134 outwardly of connector 128 for abutment with surface 146 to retain pin 134 therein while permitting relative swiveling movement of pin 134 and the attached cable 90.

It can be seen that if cables 88 and 90 are placed in sufficient tension, they will urge the respective attached bonnets 64 and 40 longitudinally toward each other thereby placing a compressive load on the interposed elastomeric rings 36. Because of the arrangement wherein each of the two cables 88 and 90 is only directly connected to one of the two bonnets 64 and 40, the other bonnet being longitudinally movable with respect to such cable, this tension, and thus the compressive loads on rings 36, can be varied by adjusting nuts 126 and 128 on pin 124. For example, if nuts 126 and 128 are moved downwardly with respect to pin 124 and the attached cable 90, an upward force is exerted on cable 90 increasing tension therein. Simultaneously, a downward force is exerted on bonnet 40, and this downward force is transmitted through the stack of rings 36 to bonnet 64 and thence the attached pin 94 and cable 88. This increases the tension of cable 88. That increase in tension in turn tends to urge lower bonnet 64 upwardly. Thus bonnets 40 and 64 are urged toward each other to increase the compressive load on the stack of rings 36. Conversely, the compressive load can be decreased by moving nuts 126 and 128 upwardly on pin 124.

Figure 3:
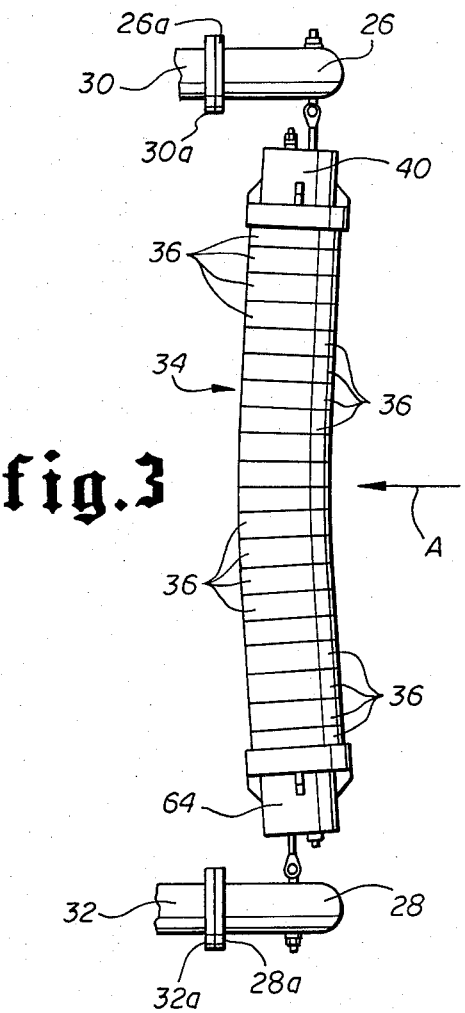

This arrangement, along with the inherent flexibility of the cables 88 and rings 36, permit the two bonnets to tilt and/or to move toward one another upon lateral impact, e.g. in the direction of arrow A as shown in FIG. 3. That figure further illustrates the deflection of the body 34 formed by rings 36 which is likewise permitted by the aforementioned flexibility. Note that the rings 36 may compress on the sides adjacent the impact to permit such flexing. Flexibility is further enhanced by the swiveling and pivotal connections of the ends of cables 88 and 90 to their respective bonnets and connectors, as well as by the fact that the apertures 60, 58, 82 and 84 are wide enough to permit limited lateral movement of each cable with respect to that bonnet to which it is not directly connected, i.e. movement of cable 88 with respect to bonnet 40 and movement of cable 90 with respect to bonnet 64. Finally, the overall ability of the assembly to accomodate impacts without damage is further enhanced by the fact that each of the rings 36 is rotatable with respect to the adjacent rings as well as with respect to the bonnets 40 and 64 and the cables 88 and 90.

The assembly also provides means for resisting relative lateral displacement of the rings 36, while permitting such displacement in limited amounts upon sufficiently great impacts. More specifically, each of the rings 36 has an annular projection 150 extending axially from its upper end and an annular recess 152 extending axially into its lower end. Each projection 150 is matingly received within the recess 152 of the ring thereabove. Thus, the projection 150 and recesses 152 serve as interlock means for resisting lateral deflection of rings 36 with respect to one another while still permitting relative rotation thereof. The projection may be omitted from the uppermost ring 36, and the recess may similarly be omitted from the lowermost ring. However, if these formations are not omitted, they will simply be flattened by the compressive load on the stack of rings as shown in FIG. 6.

Upon a sufficiently greater impact, the resiliency of the projections 150 will permit them to be forced out of their mating recesses 152. Thus, a large impact is absorbed by lateral displacement of some of the rings 36 avoiding damage to the guard device, and/or the attached offshore structure. However, such lateral displacement is limited by an integral elastomeric tube 154. Tube 154 has an outer diameter sized such that it will be spaced slightly inwardly from the inner diameters of rings 36 when those rings and tube 154 are all coaxially aligned. The amount of such spacing determines the amount of lateral displacement of the rings which will be permitted. It can be seen that tube 154 is sized to prevent complete offsetting of any of the rings 36 with respect to the others. Thus the amount of lateral displacement permitted is not so great as to interfere with operability of the device. The bore of tube 154, which receives cables 88 and 90, is wide enough so as not to interfere with the flexibility and intended lateral movement of those cables. The length of tube 154 is great enough so that it opposes all of rings 36, including a part of the uppermost one, but short enough that it does not extend to plate 50 of bonnet 40. Thus, tube 154 will maintain proper positioning of all rings without interfereing with the aforementioned adjustment of the compressive load thereon.

While the above represents one preferred embodiment, numerous modifications will suggest themselves to those of skill in the art. For example, in the above description, members 26 and 28 have been denominated "connectors." However, if these members were considered a part of the offshore structure, the swivel assemblies would then serve as the "connection means" of the apparatus. It is thus intended that the scope of the invention be limited only by the claims which follow.

I claim:

1. A guard device for disposition adjacent an offshore structure to protect said structure from impact, comprising:
    a generally tubular body of resilient material comprising a stack of elastomeric rings disposed in longitudinally aligned, end-to-end relation;
    a pair of connection means adjoined to said positioning means and disposed adjacent axially opposite ends of said tubular body for connection to said offshore structure; and
    means for applying a longitudinal compressive load to said stack of rings and including flexible positioning means extending longitudinally through the bore of said tubular body and a pair of abutment members abutting respective upper and lower ends of said stack of rings, said positioning means being connected to said abutment members and adapted to urge said abutment members longitudinally toward each other, said positioning means comprising first and second generally parallel flexible lines, said first flexible line having first stop means carried on its lower end and engageable with the lower of said abutment members to limit upward movement of said first flexible line with respect to said lower abutment member, the upper end of said first flexible line being adjoined to the upper of said connection means, said second flexible line having second stop means carried on its upper end and engageable with the upper of said abutment members to limit downward movement of said second flexible line with respect to said upper abutment member, the lower end of said second flexible line being adjoined to the lower of said connection means.

2. The device of claim 1 wherein said upper abutment member is longitudinally movable with respect to said first flexible line, said lower abutment member is longitudinally movable with respect to said second flexible line, and one of said stop means is longitudinally adjustable with respect to the respective one of said flexible lines for adjusting said compressive load.

3. The device of claim 2 wherein said upper abutment member has aperture means receiving said first flexible line for limited lateral movement, and said lower abutment member has aperture means receiving said second flexible line for limited lateral movement.

4. The device of claim 1 further comprising swivel means at each end of each of said flexible lines.

5. The device of claim 4 further comprising lateral pivot means at each end of each of said flexible lines.

6. The device of claim 1 further comprising lateral pivot means at each end of each of said flexible lines.

7. The device of claim 1 further comprising an integral flexible tube disposed within and extending along a major portion of the length of said stack of rings for limiting relative lateral displacement of said rings.

8. The device of claim 7 wherein said integral tube has a central bore receiving said flexible lines for limited lateral movement and an outer surface sized to be spaced from the inner surfaces of said rings when said rings and said tube are coaxially aligned.

9. The device of claim 8 wherein said rings include interengaged, annular, axially projecting and receiving formations for resisting lateral movement of adjacent rings with respect to one another.

10. The device of claim 9 wherein said rings are rotatable with respect to said abutment members.

* * * * *